US008469179B2

(12) United States Patent
Balzarin

(10) Patent No.: US 8,469,179 B2
(45) Date of Patent: Jun. 25, 2013

(54) MACHINE FOR TREATING CONTAINERS, IN PARTICULAR IN A PLANT FOR BOTTLING FOOD PRODUCTS

(75) Inventor: Franco Balzarin, Sarego (IT)

(73) Assignee: MBF S.p.A., Veronella (VR) (IT)

( * ) Notice: Subject to any disclaimer, the term of this patent is extended or adjusted under 35 U.S.C. 154(b) by 594 days.

(21) Appl. No.: 12/752,242

(22) Filed: Apr. 1, 2010

(65) Prior Publication Data

US 2010/0282364 A1 Nov. 11, 2010

(30) Foreign Application Priority Data

May 7, 2009 (IT) .............................. PD2009A0123

(51) Int. Cl.
*B65G 47/00* (2006.01)

(52) U.S. Cl.
USPC .................................... 198/474.1; 198/476.1

(58) Field of Classification Search
USPC .......... 198/470.1, 474.1, 475.1, 476.1, 803.9; 414/738, 739, 741, 226.01, 226.05
See application file for complete search history.

(56) References Cited

U.S. PATENT DOCUMENTS

| | | | | |
|---|---|---|---|---|
| 2,415,997 | A * | 2/1947 | Eldred | 198/343.2 |
| 3,175,704 | A * | 3/1965 | McCreery | 414/783 |
| 3,208,579 | A * | 9/1965 | Perrier et al. | 198/377.01 |
| 3,967,847 | A | 7/1976 | Ellis | |
| 4,289,228 | A * | 9/1981 | Reim et al. | 198/346.1 |
| 4,422,487 | A * | 12/1983 | McCurdy | 144/245.6 |
| 4,938,337 | A * | 7/1990 | Jowitt et al. | 198/377.03 |
| 5,421,447 | A * | 6/1995 | Ruth et al. | 198/377.1 |
| 6,035,995 | A * | 3/2000 | Leidy et al. | 198/430 |
| 6,073,746 | A * | 6/2000 | Oshiro et al. | 198/345.1 |
| 6,264,023 | B1 * | 7/2001 | Dutto et al. | 198/739 |
| 6,345,713 | B1 * | 2/2002 | Ronchi | 198/377.03 |
| 6,499,937 | B1 * | 12/2002 | Madison et al. | 414/787 |
| 7,264,108 | B2 * | 9/2007 | Borsarelli et al. | 198/429 |
| 7,455,514 | B2 * | 11/2008 | Netsu | 425/534 |
| 7,770,712 | B2 * | 8/2010 | McCabe | 198/463.1 |
| 7,992,702 | B2 * | 8/2011 | Furlotti et al. | 198/474.1 |
| 8,074,783 | B2 * | 12/2011 | Ramini | 198/470.1 |

FOREIGN PATENT DOCUMENTS

| | | |
|---|---|---|
| DE | 94 11 971 U1 | 8/1995 |
| DE | 203 05 988 U1 | 7/2003 |
| IT | 1 296 413 B1 | 6/1999 |

OTHER PUBLICATIONS

Search report issued by the Italian Patent and Trademark Office in Application No. IT PD20090123.

* cited by examiner

*Primary Examiner* — Douglas Hess
(74) *Attorney, Agent, or Firm* — Browdy and Neimark, PLLC

(57) ABSTRACT

A machine for treating containers including a turntable rotatably mounted on a frame and holding devices for containers mounted peripherally on the turntable. Each holding device includes a support mechanically connected to the turntable, at least two arms, rotatably connected to the support, with at least one holding body for grasping the container, an actuator mechanically connected to the arms to rotate them around the first rotation axis between an open position, in which the holding bodies are separated to receive or release the container, and a closed position, in which the holding bodies are close to one another to hold therebetween the container. Each holding body is connected to a support body of the respective arm through an articulation suitable for allowing the holding body to rotate around a second rotation axis lying on a plane substantially perpendicular to the first rotation axis of the arms and passing therethrough.

14 Claims, 11 Drawing Sheets

MACHINE FOR TREATING CONTAINERS, IN PARTICULAR IN A PLANT FOR BOTTLING FOOD PRODUCTS

FIELD OF APPLICATION

The present invention concerns a machine for treating containers, in particular in a plant for bottling food products, according to the preamble of the main claim.

The machine, according to the invention, is intended to be advantageously used in industrial plants for bottling beverages, such as wine or mineral water, in particular for making containers, such as bottles or the like (made from glass or plastic), undergo a rinsing treatment with one or more washing liquids.

STATE OF THE ART

Rinsing machines used in conventional bottling plants comprise, in a per se known way, a turntable rotating around its own central axis, which, along its periphery, is provided with a plurality of pincers intended to grasp the containers to be treated, typically at their necks, and to arrange them upside down at the respective rinsing groups.

Each of such rinsing groups substantially comprises an injector, equipped with a nozzle with a dispensing opening facing upwards, which through a fitting tube, is connected to a distribution valve to feed the nozzle with a washing liquid with which the containers are to be rinsed. In detail, rinsing machines are known equipped with rinsing groups with fixed nozzles, in which the nozzles are kept outside the container, and machines with mobile nozzles, in which the nozzles are moved so as to penetrate inside the container through its mouth.

Each pincer is conventionally equipped with two arms, to grasp and release a bottle, which are pivoted to a fork rotatably fixed to the support for connecting to the turntable of the relative rinsing group. The fork can undergo a rotation of 180° around a rotation axis which is transverse with respect to the central axis of the turntable to turn the container held by the arms of the pincer upside down.

Operatively, each container fed into the rinsing machine is grasped by a pincer, which turns it upside down arranging it with its mouth aligned above the nozzle of the corresponding rinsing group. Subsequently, through such a nozzle, the washing liquid for rinsing the container is injected inside the container itself. The container is then kept upside down for a certain amount of time with the purpose of allowing it to dry and to ensure that the washing liquid is completely drained. Finally, the container is brought back into the upright position and is released by the pincer at the outlet of the rinsing machine to be conveyed to the subsequent operating machines (filling machine, bottle closing machine, capping machine, etc.).

Optionally, a pre-evacuation step of the air present inside the container is foreseen which provides for introducing an inert gas (for example nitrogen) inside it before the injection of the washing liquid. Preferably, after rinsing with the washing liquid, a step is foreseen for injecting air inside the upside down container so as to facilitate the drying thereof.

A particular embodiment of the known type is described, for example, in the Italian utility model IT 241903. It concerns a rinsing machine in which the arms of each pincer are hinged to the corresponding fork through distinct pins parallel to the central axis of the turntable. The arms of each pincer are equipped with a free end thereof, intended to hold the container, and a fixed end, connected to a cam mechanism that controls both the opening and the closing of the arms themselves.

Moreover, on the free ends of the arms, holding portions are fixed, which are made up of buffers made from plastic material with a matching shape with respect to the shape of the neck of the container. These buffers have the purpose of both ensuring a tight hold on the container, as well ensuring the centring of the mouth of the container itself with the nozzle of the corresponding rinsing group when the container is upside down to be rinsed.

This known type of solution, however, is not in practice without drawbacks.

A first drawback is related to the fact that on the market there are numerous container formats, which have different neck shapes and/or sizes i.e. different bague shapes. In known types of pincers, briefly described above, it is necessary for the buffers fixed at the free ends of the arms to be changed each time to ensure the correct holding and centring of the containers as their format varies. Such operations require that the entire bottling plant be brought to a halt with consequent production idle time and a decrease in yield of the production process. Moreover, it is necessary to have specific inserts for each container format. This causes there to be a substantial worsening of production and storage costs, which are reflected in the final cost of the rinsing machine.

A further drawback is due to the fact that known types of pincers are not capable of correctly adapting to the conicity of the container neck (also variable according to the format) and thus cannot ensure a tight hold on the container itself with consequent reduction of the reliability and functionality of the rinsing machine.

Another drawback is linked to the high constructive complexity of the actuator means to determine the opening and closing of known types of pincers which thus make it easier for failures or malfunctions to occur.

PRESENTATION OF THE INVENTION

The general purpose of the present invention is thus that of overcoming the drawbacks of the aforementioned known types of solutions, by providing a machine for treating containers, in particular in a plant for bottling food products, which allows a use which is versatile to the varying of both the shape and sizes of the containers without requiring laborious adaptations to be carried out.

A further purpose of the present invention is that of making a machine for treating containers equipped with holding devices which make it possible to hold containers centred on the nozzles of the corresponding rinsing groups with the varying of the shape and sizes of the neck of such containers i.e. their bague shape.

A further purpose of the present invention is that of providing a machine for treating containers which is cost-effective and easy to manufacture.

A further purpose of the present invention is that of providing a machine for treating containers which is operatively completely reliable.

BRIEF DESCRIPTION OF THE DRAWINGS

The technical characteristics of the invention, according to the aforementioned purposes, are clearly seen in the content of the attached claims and its advantages shall become clearer from the following detailed description, given with reference to the attached drawings, which show two embodiments purely given as an example and not for limiting purposes, in which:

DETAILED DESCRIPTION

Figure 1:
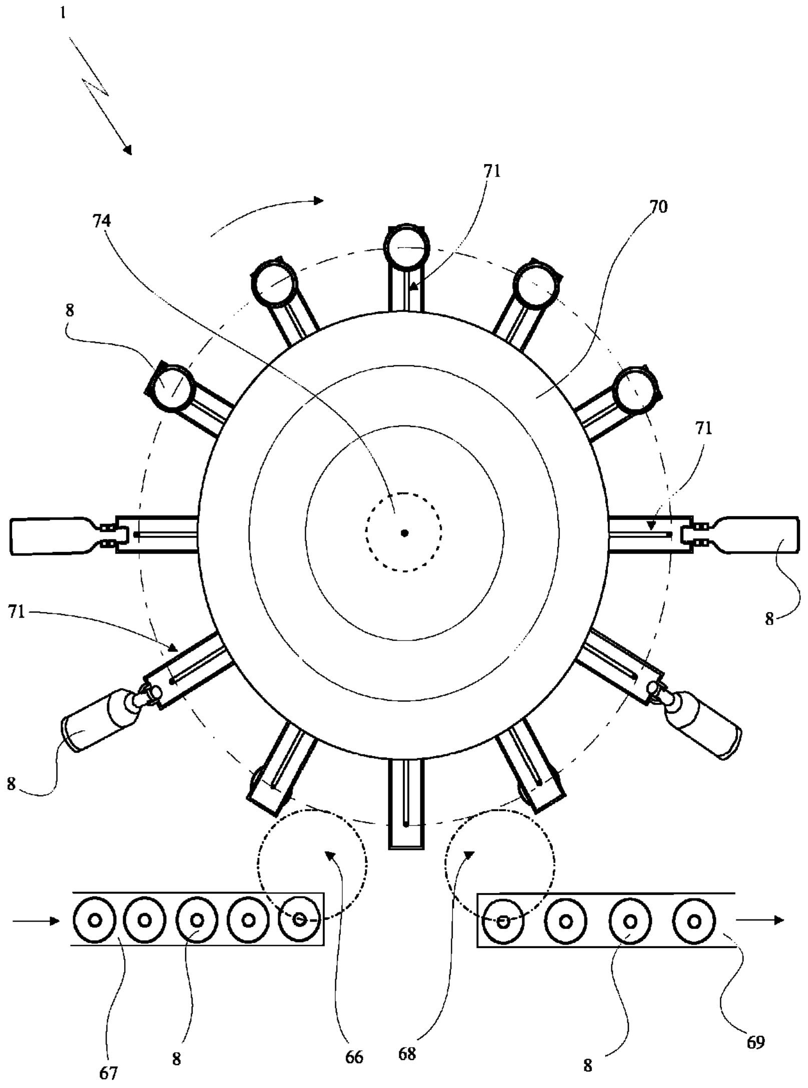
FIG. 1 shows a plan view of the machine for treating containers object of the present invention.

With reference to the attached drawings the machine for treating containers, in particular in bottling plants of food products, object of the present invention is wholly indicated with reference numeral 1.

It is inserted, in a completely conventional way, inside a plant or bottling line equipped with many machines which work in succession and in particular typically provided with a rinsing machine, with a bottling machine and with a bottle closing machine. The containers to be filled are transferred from one machine to another through transportation lines, like for example conveyor belts, or through transporting apparatuses like for example starwheels with recesses, Archimedean screws, etc.

In the rest of the description, we shall describe a preferred embodiment according to the present invention relative to a rinsing machine, although it should be clear that the technical solutions, object of the present invention, can advantageously be applied also to other types of machines, for example filling machines, bottle closing machines, apparatuses for transporting containers, etc.

In detail, we shall describe a rotating rinsing machine with fixed nozzles, which makes it possible to subject containers 8, typically bottles or similar, to a treatment with a washing liquid product for cleaning or even sterilizing their inner surface.

With reference to FIG. 1, the machine 1 is conventionally provided with an inlet station 66, in which it receives the containers 8 to be rinsed, from a first transport line 67, and an outlet station 68, in which the rinsed containers 8 are released onto a second transport line 69 so as to be conveyed towards a machine downstream, for example a filling machine.

Figure 2:
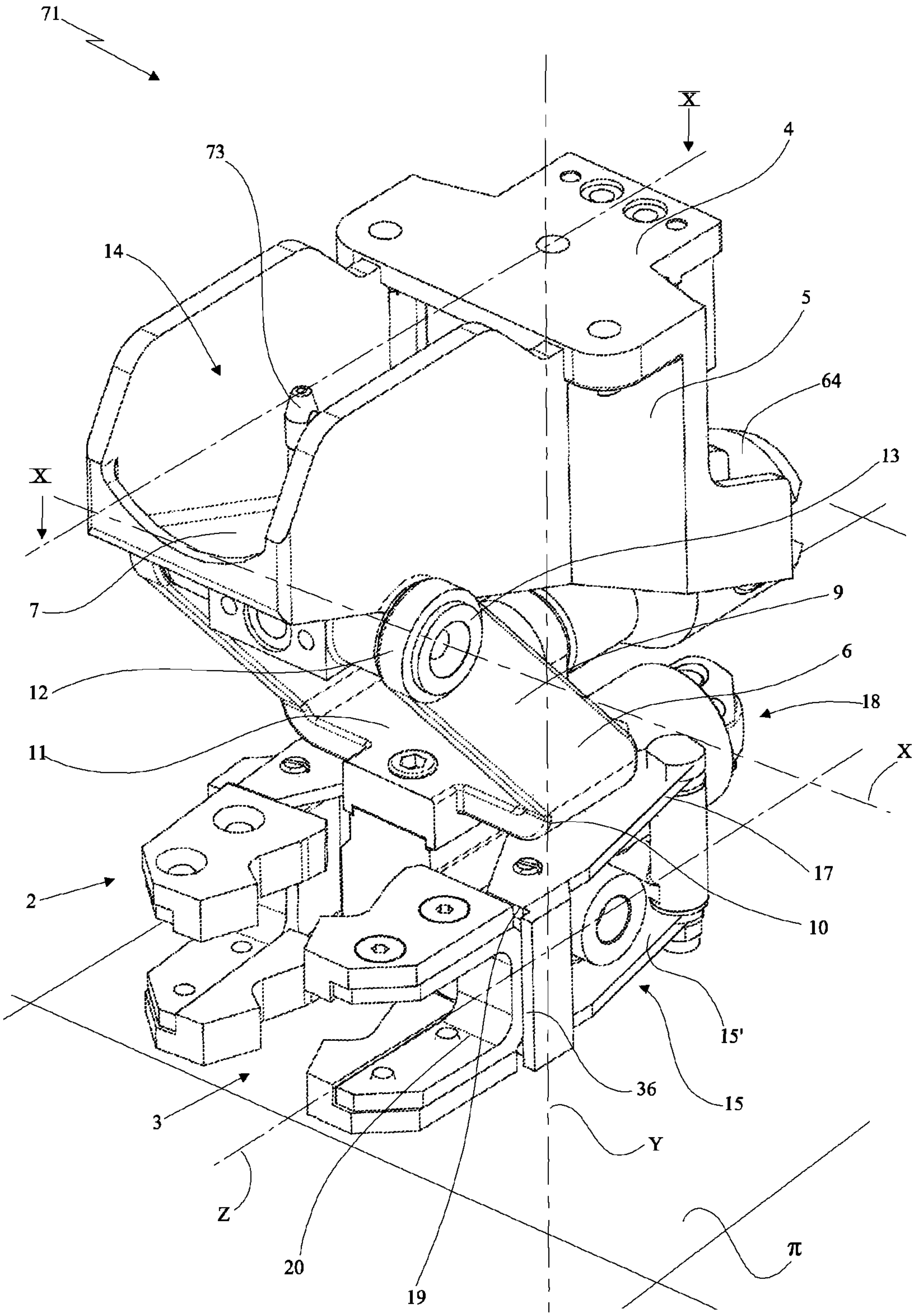
FIG. 2 shows a perspective view of a detail of the machine illustrated in FIG. 1 relative to a container holding device.

The machine 1 comprises, in a completely conventional way, a support frame on which a turntable 70 is rotatably mounted, set in rotation around its own vertical shaft 74 through known type motor means. On the periphery of the turntable 70, a plurality of rinsing groups 71 are evenly distributed over its circumference. Each rinsing group 71 substantially comprises a support structure 4 fixed to the turntable 70 of the machine 1 on which a draining basin 7 is mounted, connected to a run-off circuit to drain the washing liquid used during the rinsing treatment. As can be seen from the examples illustrated in FIGS. 2, 10 and 11, an injector 72, equipped with a nozzle 73 with a dispensing opening facing upwards, extends inside the draining basin 7. Such an injector 72 is connected through a pipe fitting to a distribution valve for feeding the nozzle 73 with the washing liquid with which the containers 8 are washed.

Figure 3:
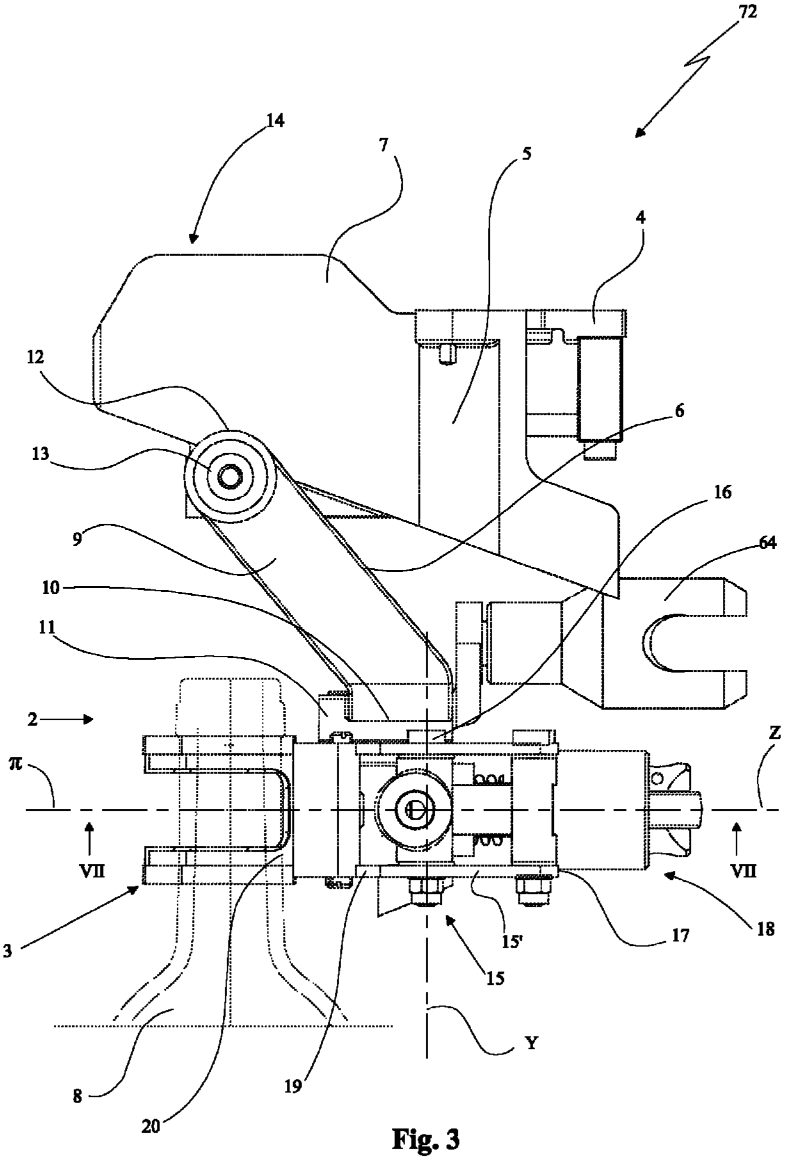
FIG. 3 shows a side view of the container holding device illustrated in FIG. 2.

Each rinsing group 71 also comprises a container holding device 2, which is provided with a pincer 3, to grasp and release the containers 8, mounted on the support structure 4. With reference to the example embodiment illustrated in FIGS. 2 and 3, the support structure 4 comprises a fork 6, which supports the pincer 3 and is hinged to a bracket 5 fixed to the turntable 70. The fork 6 is actuated to rotate so as to turn upside down the container 8, held by the pincer 3, with its mouth aligned above the nozzle 73 of the injector 72.

Of course, without for this reason departing from the scope of protection of the present patent document, the holding device 2 can be associated with any operative group of a machine for treating containers in a bottling plant, i.e. it can operate regardless of a specific operative group like, for example, in an apparatus for transporting containers.

In detail, the fork 6 is conventionally equipped with two parallel elongated portions 9, fixed at one of their first ends 10 to a transverse connection plate 11, on which the pincer 3 is fixed, and hinged at a second end 12 to the bracket 5 through a hinge 13. The hinge is arranged under the draining basin 7 and extends horizontally along an inverting axis X tangent to the circumference of the turntable 70 in the point in which the holding device 2 is mounted on it. In this way the pincer 3 can substantially rotate by 180° from a lowered position, in which it is placed under the draining basin 7, to a lifted position, in which it is placed above the same draining basin 7 at its own upper open face 14. The rotation of the pincer 3 between the lowered position and the lifted position is controlled, for example, by a fixed tubular cam (not illustrated), which is mounted around the machine 1. A guide 64 fixed to the fork 6 is slidingly engaged with the tubular cam to control the movement of the pincer 3 after the turntable 70 has rotated.

The pincer 3 of the holding device 2 comprises two arms 15 pivoted to the plate 11 of the fork 6 to rotate around their own first rotation axis Y preferably parallel to the vertical shaft 74 of the turntable 70 of the machine 1. In accordance with the embodiments illustrated in the attached figures, the arms 15 are arranged symmetrically with respect to a radial axis R of the turntable 70 and are rotatably pivoted on corresponding first cylindrical hinge pins 16 to rotate around the first rotation axis Y.

Each arm 15 of the pincer 3 comprises a support body 15' pivoted to the plate 11 of the fork 6 mechanically associated with the actuator means 18 suitable for opening and closing the pincer 3, and a holding body 20 mechanically connected to the support body 15' of the arm 15 and intended to grasp and release the containers 8, preferably at their necks 37.

Operatively, the actuator means 18 actuate the arms 15 to rotate around their first rotation axis Y between at least one open position, in which the respective holding bodies 20 are separated so as to receive or release the container 8, and at least one closed position, in which the same holding bodies 20 are moved closer together to hold the container 8 between them.

In accordance with the idea the present invention is based upon, each one of the holding bodies 20 of the holding device 2 is connected to the support body 15' of the respective arm 15 through at least one articulation 21 suitable for allowing the holding body 20 itself to rotate at least around a second rotation axis Z lying on a plane $\pi$ substantially perpendicular to the first rotation axis Y of the arms 15 and passing through them. When the pincer 3 closes upon the container 8, the holding bodies 20, thanks to their free rotation around the respective second rotation axis Z, go into abutment with the neck 37 of the container 8 correctly following the profile, i.e. conicity, thereof.

The articulation 21 allows the holding body 20 to carry out further rotation movements as well as that around the second rotation axis Z with the purpose of allowing the holding device 2 to tightly grasp and centre containers 8 having particular shape and sizes.

More in detail, in accordance with the preferred embodiment illustrated in the attached figures, the support body 15' of the arm 15 has a fork structure and comprises two, opposing and parallel, plate-like longitudinal elements 22. These mainly extend from a third end 17, at which the support body 15' is connected to the actuator means 18, and a fourth end 19, where they are rigidly fixed to one another by a transverse element 23 and at which the support body 15' is connected to the respective holding body 20.

The longitudinal elements 22, are also equipped with through eyelets 43 aligned with one another and through which the first cylindrical hinge pin 16, that fixedly connects the arm 15 to the plate 11 of the fork 6, is inserted. Preferably, each eyelet 43 is formed on the relative longitudinal element 22 in an intermediate position between the third end 17 and the forth end 19 of the support body 15' of the arm 15.

Advantageously, the articulation 21, which connects the two parts of each arm 15, i.e. the support body 15' to the respective holding body 20, comprises a male-female coupling between a pin 28 and a seat 29 formed one in the retaining body 15' and the other on the holding body 20 and rotatably coupled with one another around the axis of the pin 28. More in detail, in accordance with the example shown in the attached figures, the pin 28 extends coaxially with respect to the second rotation axis Z, whereas the seat 29 is formed on the transverse element 23 of the arm 15 and has a substantially cylindrical shape coaxial with respect to the second rotation axis Z. Such a seat 29 has a slightly greater diameter than that of the pin 28 so as to allow it to fittingly insert itself inside the same seat 29 rotating without clearances.

Advantageously, the second rotation axis Z of the holding body 20 of each arm 15, which passes through the longitudinal development of the pin 28 and of the seat 29, is substantially oriented along the longitudinal development of the same arm 15.

As can be seen in figures from 4-6, the holding body 20 of each arm 15 is also advantageously fork-shaped, comprising two elongated elements 27 parallel to one another and to the second rotation axis Z as well as being fixed to a connection base 24 perpendicular to the same elongated elements 27. The connection base 24 carries the pin 28 fixed in a central position and parallel to the elongated elements 27 but oriented with opposite development to them.

In normal operative conditions, the elongated elements 27 are arranged substantially one above and the other below the plane $\pi$ on which the second rotation axis Z lays. Advantageously, such elongated elements 27 are provided with a shaped inner side 41, which is intended to receive the neck 37 of the container 8 resting against it, to grasp it, and an outer side 42, opposite the inner one and substantially rectilinear.

Usefully, the two elongated elements 27 of the holding body 20 of each arm 15 are separated from one another with an empty space suitable for allowing the insertion of the pincer mounted on an operating machine (i.e. on an apparatus for transporting containers) placed directly upstream or downstream of the machine 1 during the transfer of the containers 8 from one machine to another.

In accordance with a particularly advantageous characteristic of the present invention, the elongated elements 27 of each holding body 20 define, on their inner side 41, opposing concave profiles intended to stick onto the neck 37 of the container 8 in at least two contact points. Such opposing concave profiles are shaped to wrap around the tangent points with the neck 37 of the containers 8 as the diameter of their necks 37 varies (according to the format of the containers 8 and within a range of between 20-40 mm), when of course the arms 15 are in their closed position.

Figure 4:
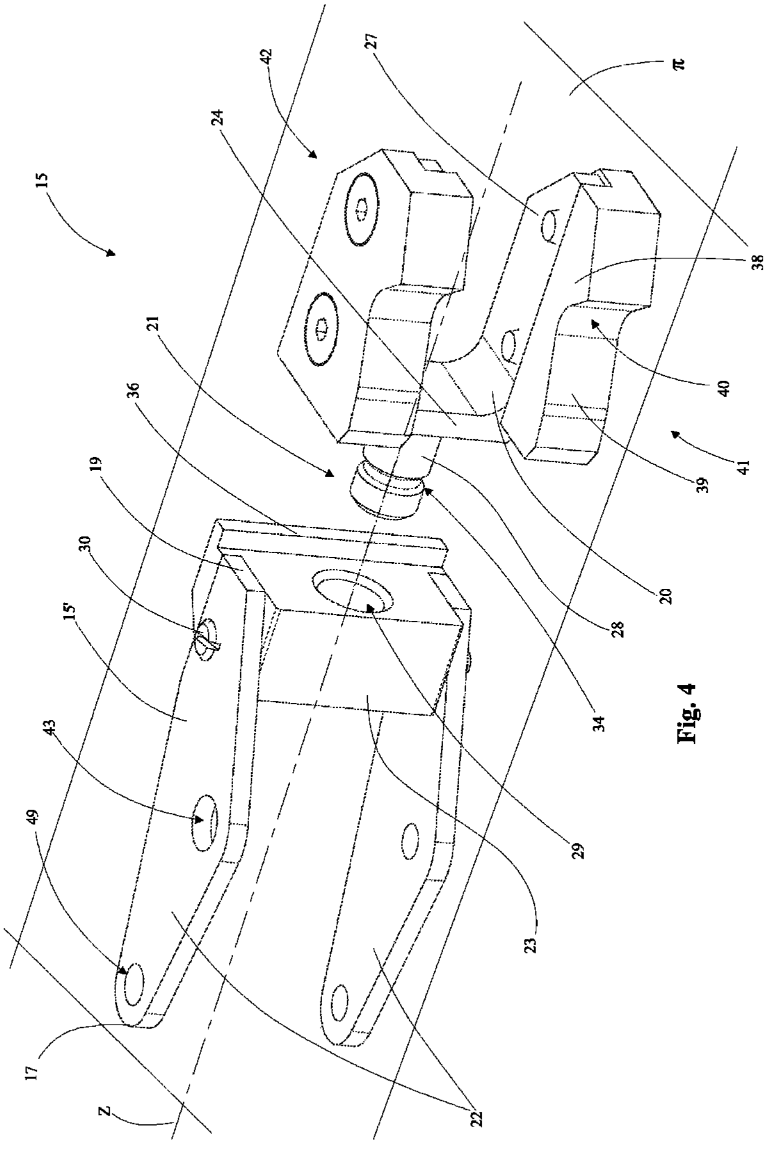
FIG. 4 shows a perspective view of a detail of the container holding device illustrated in FIG. 2 relative to an arm and to the corresponding holding element.
Figure 5:
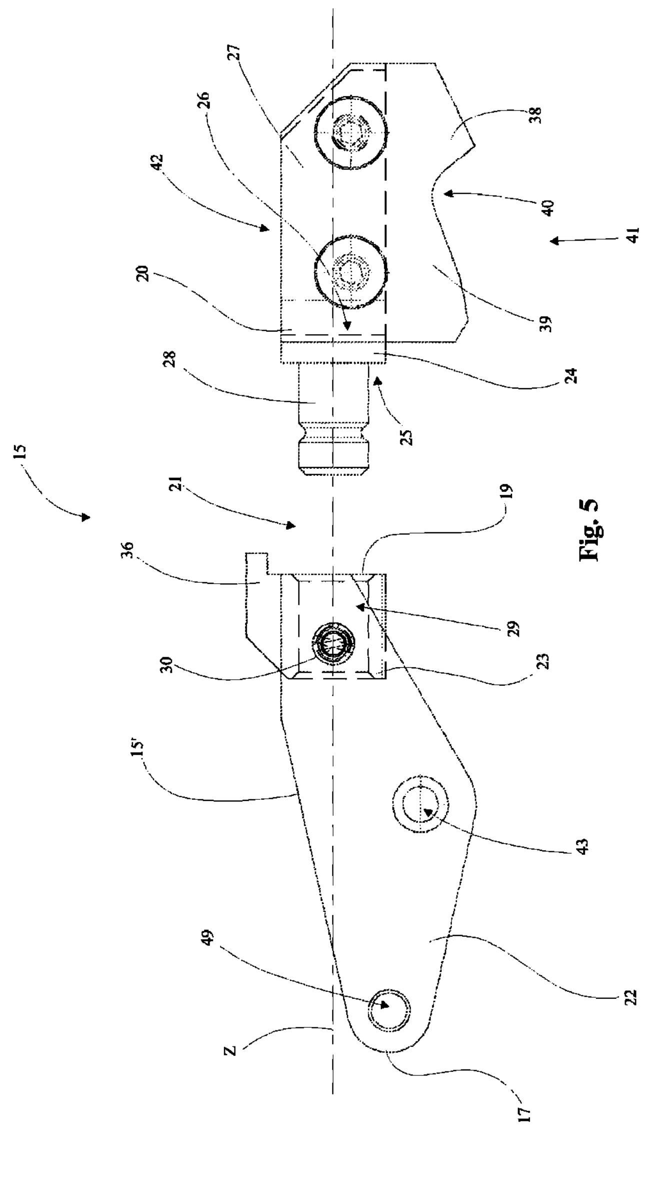
FIG. 5 shows a plan view of the arm and of the holding body illustrated in FIG. 4.
Figure 6:
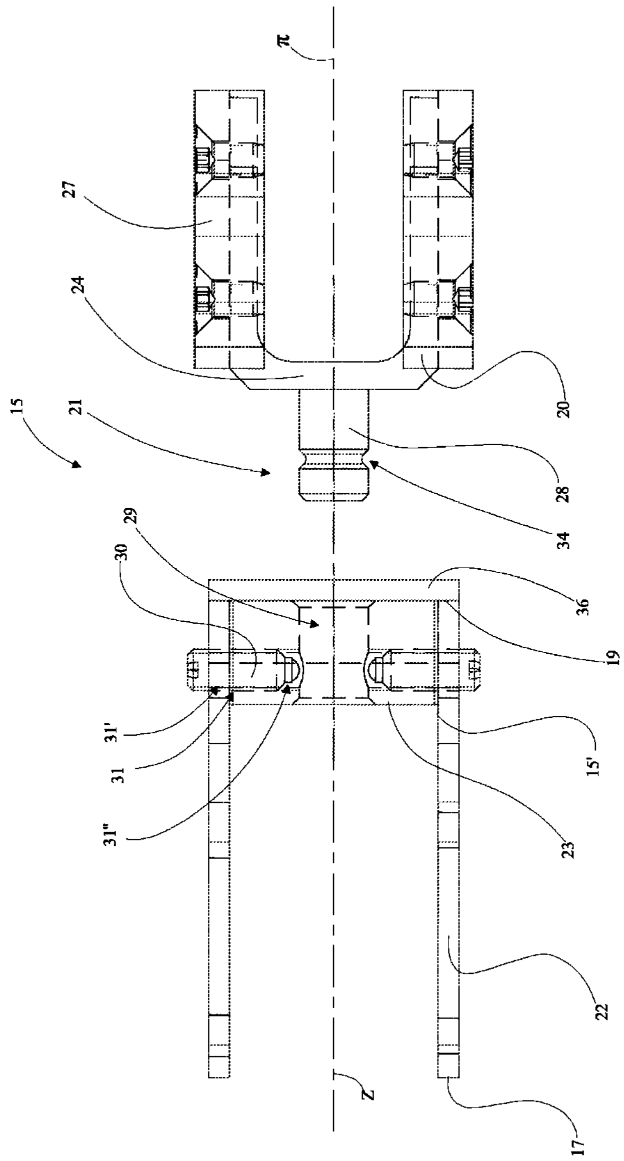
FIG. 6 shows a side view, partially in section, of the arm and the holding body illustrated in FIG. 4.
Figure 8C:
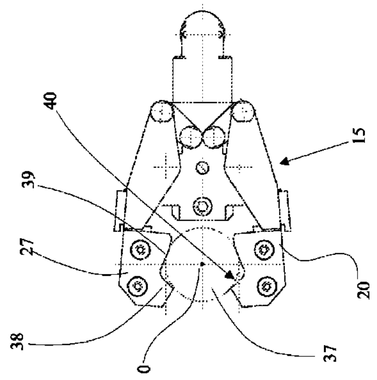
FIGS. 8*a*, 8*b* and 8*c* show the holding device illustrated in FIG. 2 in a top view with the arms in their closing position to hold different sized containers.
Figure 8B:
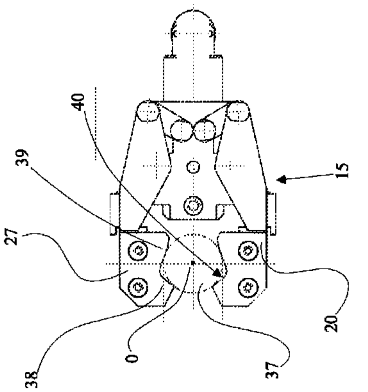
Figure 8A:
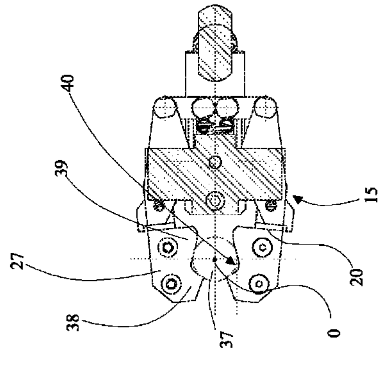

In detail, with reference to FIGS. 8*a*, 8*b* and 8*c*, when the arms 15 of the pincer 3 are in the closed position, the concave profile of the elongated elements 27 is arranged across the convexity of the neck 37 of the container 8 in two distinct positions placed one before and one after the convexity through a first holding portion 38 and a second holding portion 39. The two holding portions 38, 39 of the elongated elements 27 are separated from one another by an indentation 40, as can be seen in FIGS. 4 and 5. Preferably, the second portion 39 of the elongated elements 27 has a slight convexity with the purpose of further improving the hold of the neck 37 of the container 8.

Usefully, the elongated elements 27 of the holding bodies 20 of the arms 15 are covered in a plastic material or carry mounted rubber inserts with the purpose of improving the adherence with the neck 37 of the container 8.

Advantageously, each support body 15' of the arms 15 is equipped with at least one abutment element 36 which is able to interfere with the relative holding body 20 to limit its rotation around its second rotation axis Z.

In detail, with reference to FIGS. 2-6, the abutment element 36 comprises a step-like protrusion that extends from the fourth end 19 of the support body 15' of the arm 15 towards the holding body 20 partially facing the outer side 42 of the two elongated elements 27. Preferably, the abutment element 36 extends between the two longitudinal elements 22 of the support body 15' of the arm 15 i.e. in accordance with a different embodiment not illustrated, it is equipped with at least two protruding steps arranged on opposite sides with respect to the second rotation axis Z, preferably at the longitudinal elements 22 of the arm 15. The abutment element 36 is fixed to the transverse element 23 of the arm 15, i.e. it is made in one piece with it. Operatively, the abutment element 36 is able to come into contact with the outer side 42 of the holding body 20 at one or the other of its elongated elements 27 preventing it from rotating beyond certain limit positions, and thus confining the inner side 41 of the elongated elements 27 that holds onto the neck 37 of the containers 8 with an inclination $\beta$ ranged between +15° and −15° with respect to the axis of the container S.

The pin 28 is held axially in the seat 29 of the relative support body 15' of the arm 15 through foreseen retaining means. These comprise a ball plunger 30, which is screwed into a first through hole 31 formed on the retaining body 15' and engages with the ball arranged at the shank end in an annular groove 34 of the pin 28 to keep it in the seat 29.

With reference to the example embodiment illustrated in figures from 4-6, on each support body 15' of the arms 15 at least two first holes 31 are foreseen aligned to hold the pin 28 in the seat 29 in a more even way around its circumference allowing axial rotations which are guided and without jamming. Each first through hole 31 is formed, for its first part 31' in the longitudinal element 22 and, for its second part 31" continuing on from the first and in communication with the seat 29, in the transverse element 23.

The two longitudinal elements 22 are made in a single piece with the transverse element 23 of the arm 15 i.e. they are rigidly fixed to it through welding.

Advantageously, the actuator means 18, which control the opening and closing of the arms 15 of the pincer 3, comprise a cylinder 44 fixed to the plate 11 of the fork 6 coaxially with respect to the radial symmetry axis R of the pincer 3 itself. Inside such a cylinder 44 a piston 45 is slidingly housed, said piston being mechanically connected to the arms 15 through transmission means comprising, for example, a toggle mechanism 52. Operatively, the piston 45 is moved by control means associated with the machine 1 between a first position in which the arms 15 of the pincer 3 are in the closed position to hold the container 8, and a second position, in which the arms 15 of the pincer 3 are in the open position to receive or release the container 8.

Figure 7:
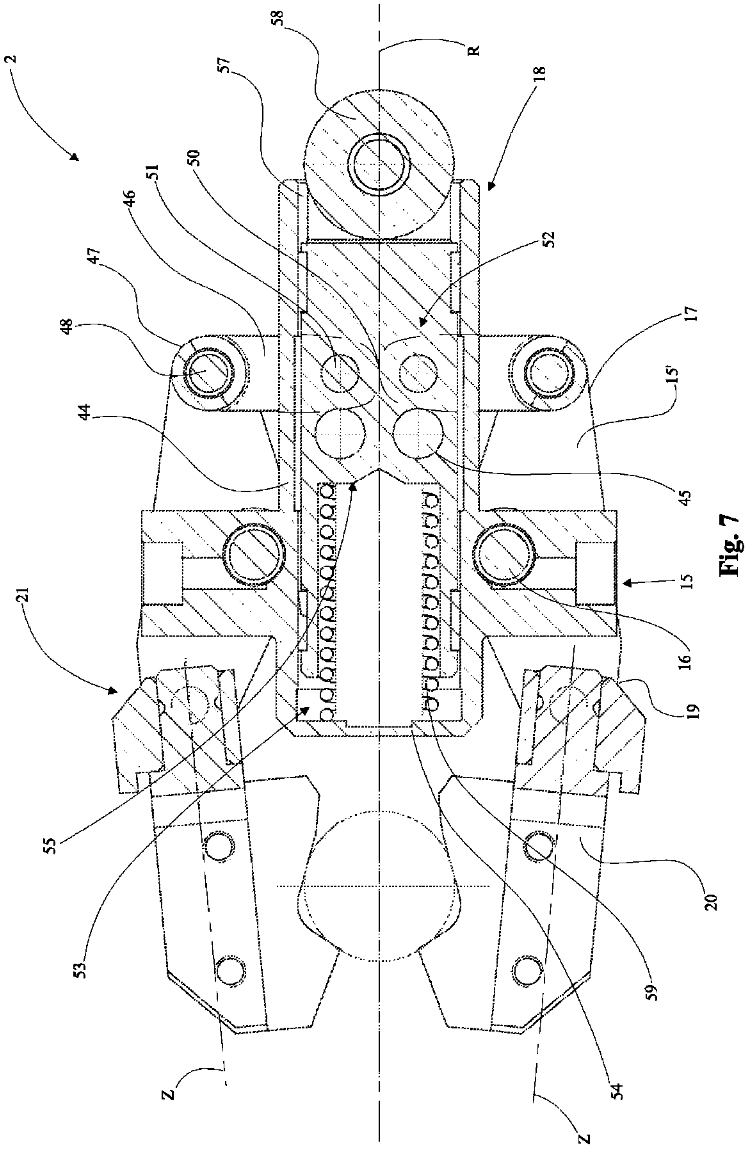
FIG. 7 shows a section view of the container holding device illustrated in FIG. 3 according to the line VII-VII of the same FIG. 3.
Figure 10:
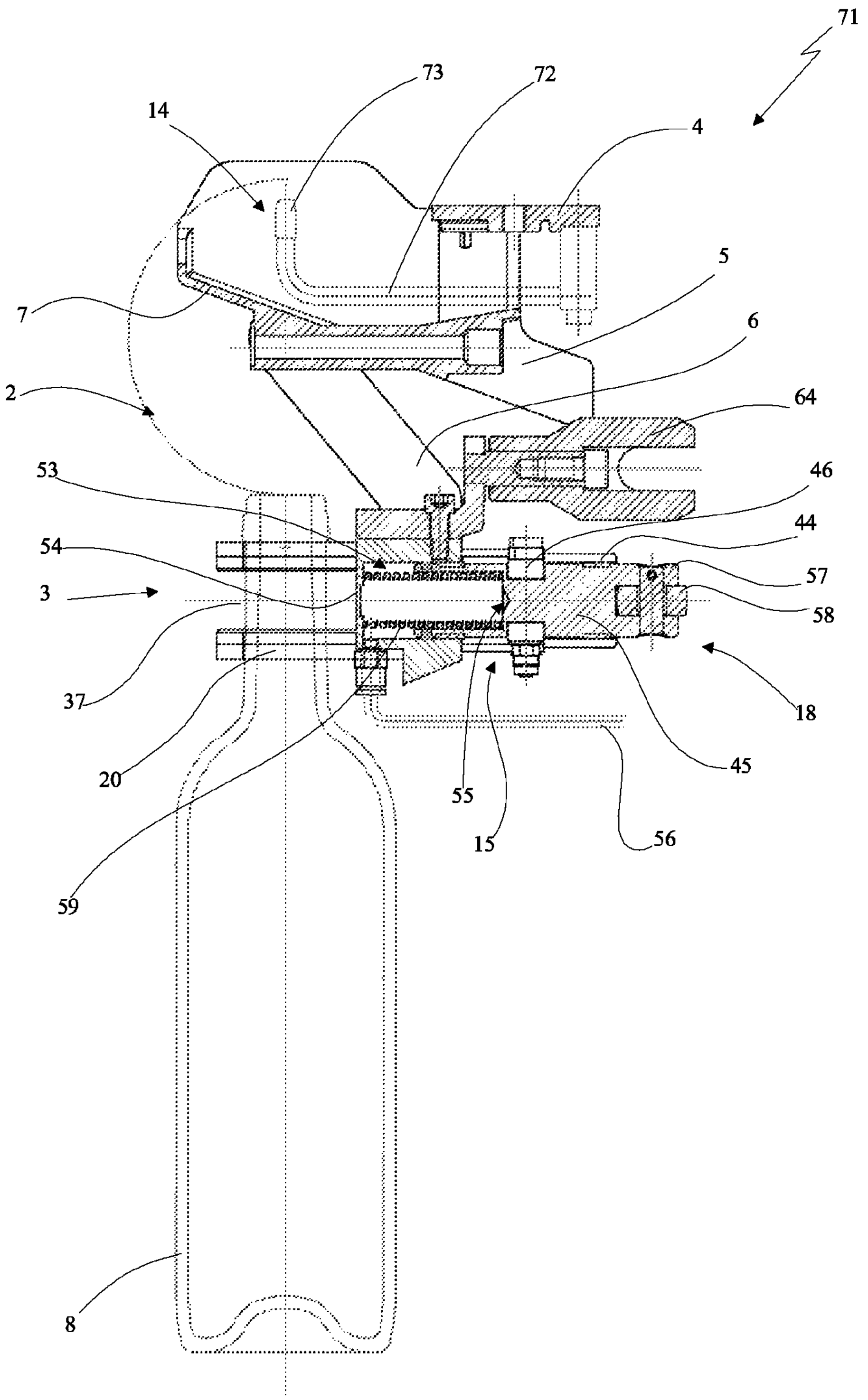
FIG. 10 shows a section view of the container holding device illustrated in FIG. 2 according to the line X-X of the same FIG. 2.
Figure 11:
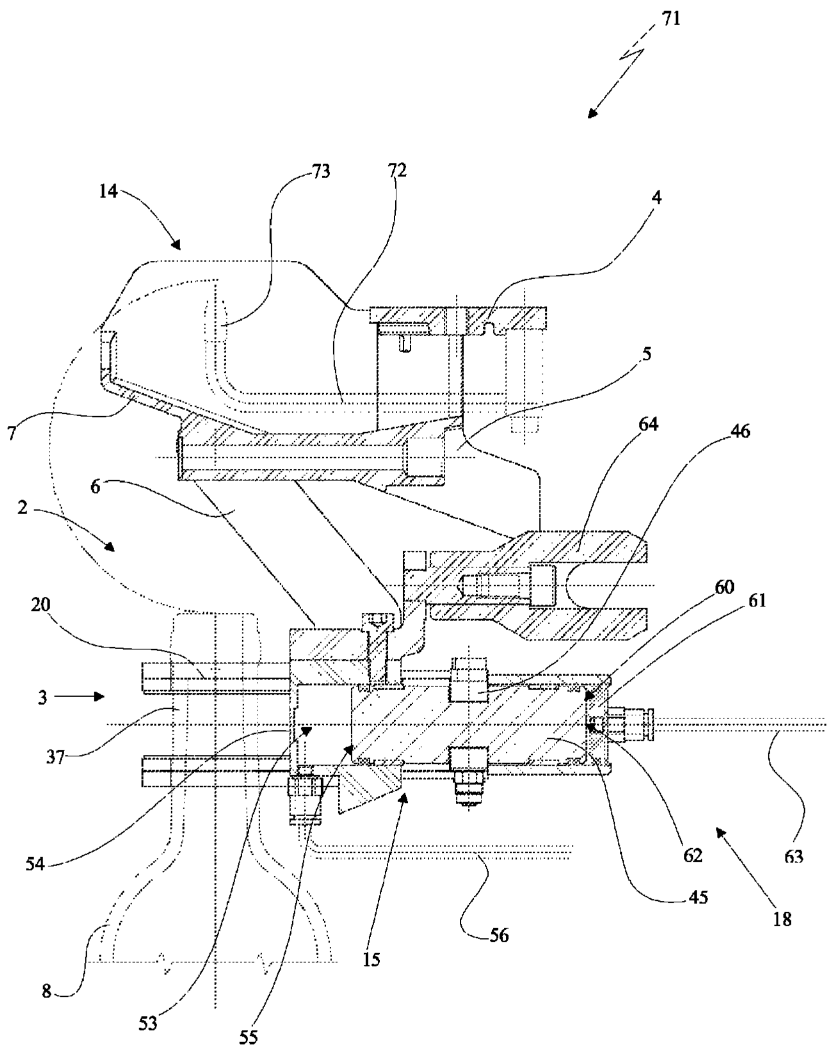
FIG. 11 shows a section view of a detail of the machine for treating containers relative to the container holding device in accordance with a second embodiment of the invention.

In detail, with reference to FIGS. 7, 10 and 11, the toggle mechanism 52 of the piston 45 substantially comprises two levers 46 each of which is rotatably fixed, at its own fifth end 47, to the support body 15' of one of the arms 15 and, at its opposite sixth end 50, to the piston 45. More in detail, the connection of the lever 46 to the support body 15' is obtained through a second cylindrical hinge pin 48 inserted into second holes 49 formed in the longitudinal elements 22 of the support bodies 15' themselves. The levers 46, are also rotatably pivoted at their sixth end 50, to a piston 45 through third cylindrical hinge pins 51 arranged symmetrically with respect to the radial axis R.

Advantageously, the piston control means 45 comprise first pneumatic means for moving the latter in its first position with the arms 15 of the pincer 3 in the closed position. In detail, the cylinder 44 defines, with the piston, at least one first compression chamber 53, which is defined between a front wall 54 of the cylinder 44 and a corresponding front face 55 of the piston 45. It is also foreseen for there to be a first air duct 56 connected to the first compression chamber 53, through which the first pneumatic means inject compressed air inside the same first chamber 53 with the purpose of moving the piston 45 into its first position and thus close the arms 15 of the pincer 3. The piston 45, when it is pushed by air into the first position, it is at the end stop of the cylinder 44 placed at the inner part of the holding device 2 farther with respect to the container 8. The pneumatic closure of the pincer 3 obtained through the first pneumatic means offers excellent guarantees that the containers 8 will be held safely.

In accordance with a first embodiment of the present invention illustrated in FIGS. 2-10, the piston control means 45 advantageously comprise at least one cam mechanism to move the piston 45 itself, into its second position with the arms 15 of the pincer in their open position, i.e. at the end stop of the cylinder 44 placed at the outer part of the holding device 2 closest to the container 8. As illustrated in FIGS. 7 and 10, the piston 45, at its own rear end part 57, carries a cam follower 58, for example made up of a wheel rotatably pivoted to the piston itself 45. Such a cam follower 58 is controlled by a fixed cam (not illustrated since it is per se known), which is all one with the support structure of the machine 1 between the holding devices 2 and the vertical shaft 74 for rotating the turntable 70. It is also foreseen for there to be elastic means, for example, a spring 59, which is compressed between the front wall 54 of the cylinder 44 and the front face 55 of the piston 45. Such a spring 59 has the function of elastically pushing the piston 45 towards the fixed cam to keep the cam follower 58 pressed against its surface and thus to allow the movement of the piston 45 between the two operative positions.

Otherwise, instead of the cam mechanism, in accordance with a second particularly advantageous embodiment illustrated in FIG. 10, the control means of the piston 45 comprise second pneumatic means to move it in its second position with the arms 15 of the pincer 3 in their open position. In detail, the cylinder 44 defines, with the piston 45, at least one second compression chamber 60, which is defined between a back wall 61 of the cylinder 44 and a corresponding back face 62 of the piston 45. A second air duct 63 is also foreseen connected to the second compression chamber 60 through which second pneumatic means inject compressed air inside the second compression chamber 60 for moving the piston 45 into its second position and thus open the arms 15 of the pincer 3.

In accordance with this second embodiment, the control means of the piston 45 are completely pneumatic to carry out both the opening and the closing of the arms 15. Such a solution reduces the risk of failures due to wearing of mechanical parts (such as cams, wheels, springs, etc.) which undergo wearing due to friction during operation.

Operatively, by rotating, the turntable 70 of the machine 1 moves the holding devices 2 to the inlet station 66 to withdraw the containers 8 conveyed by the first transport line 67.

For this purpose, the arms 15 of the pincer 3 are moved by the actuation means 18 into the open position to receive, between the rubber inserts of the holding body 20, the neck 37 of a container 8. In this operative step, the pincer 3 is in its lowered position with the arms 15 arranged under the injector 72 of the corresponding rinsing group 71.

Subsequently, such arms 15 are moved into their closed position to grasp the neck 37 of the container 8. Then the container is turned upside down through rotation of the pincer 3 around the inverting axis X with a movement from its lowered position to its lifted position. In this way, the container 8 is moved over the draining basin 7 with its own mouth aligned above the nozzle 73 of the injector 72.

Subsequently, the nozzle 2 sprays the washing liquid through the mouth of the container 8 to rinse the inner surface of the container 8, itself. The washing liquid, which by gravity, comes out from the mouth of the container 8, is conveyed from the draining basin 7 to the suitable run-off circuit. Subsequently, the container 8 is moved back into its upright position moving the pincer 3 back into its lowered position. Finally, the arms 15 of the pincer 3 are moved into their open position to release the container 8 at the outlet station 68 of the machine 1.

In detail, in accordance with both embodiments illustrated in the attached figures, the closing step of the arms 15 of the pincer 3 foresees that first pneumatic means of the control means of the piston 45 inject compressed air inside the first compression chamber 53 of the cylinder 44 with the purpose of pushing the piston 45 away from the front part 54 of the same cylinder 44. In this way, the piston 45, is taken back into its first position, in which it arranges the levers 46 which connect it to the arms 15 with the sixth ends 50 moved back, towards the inner part of the holding device 2, as illustrated for example in FIG. 7. In this first position of the piston 45, the actuator means 18 keep the third end 17 of the support bodies 15' of the arms 15 separated from one another, thus keeping the opposite fourth end 19 closer so as to close the arms 15 themselves.

In accordance with the first embodiment of the holding device 2 illustrated in detail in FIG. 10, the opening step of the arms 15 foresees removing pressure from the first compression chamber 53 and acting with the fixed cam on the cam follower 58, of the piston 45, pushing it closer to the front wall 54 of the cylinder 44 to bring the piston 45 itself into its second position.

In accordance with the second embodiment illustrated in FIG. 10, the opening step of the arms 15 foresees that pressure is taken out from the first compression chamber 53 and compressed air is injected inside the second compression chamber 60 through the second pneumatic means of the control means of the piston 45. In detail, such an introduction of air causes the expansion of the second chamber 60 and the contraction of the first chamber 53 with the purpose of pushing the piston 45 away from the back wall 61 of the cylinder 44.

In accordance with both embodiments of the machine 1, object of the present invention, the movement of the piston 45 from the first to the second position determines the rotation of the arms 15 around the first cylindrical hinge pins 16 controlled by the actuation of the levers 46 that pull the third ends 17 of the support portions 15' of the arms 15 towards one another.

The angle subtended by the arms 15, when these are closed around a container 8, can be more or less wide according to the size of the neck 37 of the same container 8, as illustrated for example in FIGS. 8*a*, 8*b* and 8*c* that refer to three containers having different format.

In particular, in the example illustrated in FIGS. 8*b* and 8*c*, the arms 15 of the pincer 3 are placed in their closed position to hold the neck 37 of a container 8 having a relatively large diameter (for example, 32 and 40 millimeters, respectively). The container 8 is held between rubber inserts entering in abutment on two distinct contact points. In particular a first contact point is foreseen at the first holding portion 38, whereas a second contact point is foreseen at the second holding portion 39. Such portions are, within reasonable size margins of the necks 37 of containers 8, always tangent with respect to the necks 37 of the containers 8 even as their sizes vary so as to exert on the same necks 37 forces which are always directed towards a same centre O. Therefore, the holding device 2 of the machine 1 makes it possible to position the containers 8 with the mouth always aligned with respect to the centre O (and therefore with respect to the nozzle 73 of the corresponding rinsing group 71).

Such a condition is also repeated even when holding containers 8 having a relatively tight neck 37 (for example 24 millimeters), as illustrated in FIG. 8*a*.

In the limit case, not illustrated, in which the arms 15 of the pincer 3 are arranged to hold a container 8 with a particularly tight neck 37 (for example, having a diameter of 20 millimeters), the latter will go to rest with a convex perimeter portion on an indentation 40 for dividing the holding portions 38 and 39, which is shaped to partially follow the profile of such a perimeter portion of the container 8 ensuring a good hold and correct centring.

Figures 9A, 9B, 9C:
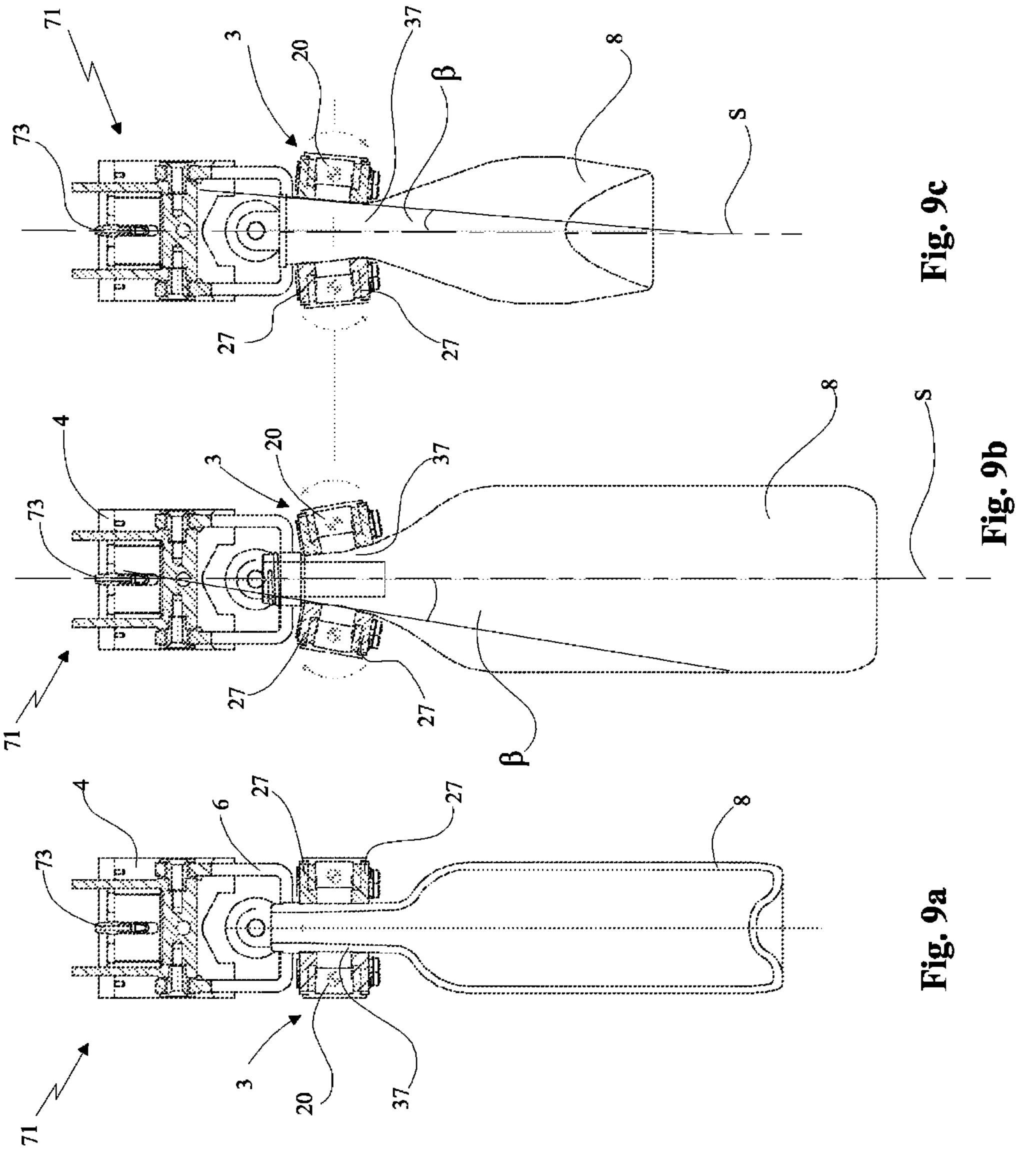
FIGS. 9*a*, 9*b* and 9*c* show the holding device illustrated in FIG. 2 in a side view with the arms in the closed position to hold different shaped containers.

In accordance with a further advantageous characteristic of the present invention, the articulation 21 that connects the arms 15 of each holding device 2 to the corresponding holding bodies 20 allows them to rotate around the second rotation axis Z perfectly adapting to the conicity of the neck 37 of different formats of containers 8. In particular, as illustrated in FIGS. 9*a*, 9*b* and 9*c*, such a rotation allows both elongated elements 27 of the holding bodies 20 to rest with their concave profile against the outer surface of the neck 37 of the containers 8 ensuring a correct and stable hold.

The invention thus described achieves the predetermined purposes.

Of course, it can take up, in its practical embodiment, even shapes and configurations which are different from the one illustrated above, without, for this reason, departing from the present scope of protection. Moreover, all the details may be replaced by technically equivalent elements and the shapes, sizes and materials used can be any according to the requirements.

The invention claimed is:

1. A machine (1) for treating containers, in particular in a plant for bottling food products, which comprises:

a support frame;

a turntable (70) rotatably mounted on said support frame to rotate around its own vertical shaft (74);

a plurality of holding devices (2) for containers (8) mounted peripherally on said turntable (70) and each comprising:

a support structure (4) mechanically connected to said turntable (70);

at least one pincer equipped with two arms (15), each having a longitudinal development and pivoted on said support structure (4) to rotate around its own first rotation axis (Y); each of said arms (15) comprising at least one holding body (20) intended to grasp said container (8);

an actuator (18) mechanically connected to said arms (15) to actuate these to rotate around said first rotation axis (Y) between at least one open position, wherein said holding bodies (20) are separated from one another to receive or release said container (8), and at least one closed position, wherein said holding bodies (20) are close to one another to hold said container (8) between them;

wherein each of said holding bodies (20) of said holding device (2) are connected to a support body (15') of the respective arm (15) through at least one articulation (21) suitable for allowing said holding body (20) to rotate at least around a second rotation axis (Z) lying on a plane ($\pi$) substantially perpendicular to said first rotation axis (Y) of said arms (15) and passing through them, wherein the second rotation axis (Z) of said holding body (20) being substantially parallel to the longitudinal development of said arm (15), in order to allow said holding body (20) to rotate around said second rotation axis (Z) adapting to the conicity of a neck (37) of different formats of containers (8).

2. The machine (1) for treating containers, in particular in a plant for bottling food products, according to claim 1, wherein the articulation (21) of said holding device (2) comprises a pin (28) fixed to said holding body (20), coaxial with respect to said second rotation axis (Z) and intended to be inserted inside a corresponding seat (29) formed on said arm (15) to rotate around said second rotation axis (Z).

3. The machine (1) for treating containers, in particular in a plant for bottling food products, according to claim 2, wherein said holding device (2) comprises restraint means mounted on said arms (15) to prevent the pin (28), of said holding body (20), from axially sliding in said seat (29).

4. The machine (1) for treating containers, in particular in a plant for bottling food products; according to claim 3, wherein the restraint means of said holding device (2) comprise at least one ball plunger (30) engaged inside a first hole (31) formed in said arms (15) and in communication with said seat (29); each one of said ball plungers (30) being able to slidingly insert themselves into an annular groove (34) formed on said pin (28).

5. The machine (1) for treating containers, in particular in a plant for bottling food products, according to claim 1, wherein each arm (15) of said holding device (2) is equipped with at least one abutment element (36) able to interfere with said holding body (20) to limit its rotation around said second rotation axis (Z).

6. The machine (1) for treating containers, in particular in a plant for bottling food products, according to claim 1, wherein the holding bodies (20) of said holding device (2) comprise a connection base (24), substantially perpendicular to said second rotation axis (Z), from which at least two elongated elements (27) extend substantially parallel to said rotation axis (Z) and equipped with an inner side (41) shaped to receive said container (8) resting against it.

7. The machine (1) for treating containers, in particular in a plant for bottling food products, according to claim 1, wherein the holding bodies (20) of said holding device (2) define opposing concave profiles intended to receive the neck (37) of said container (8) resting against them in at least two contact points; said opposing concave profiles being shaped to wrap around the tangent points of said holding bodies (20) with the neck (37) of said container (8) as the diameter of said neck (37) varies, when said arms (15) are in said closed position.

8. The machine (1) for treating containers, in particular in a plant for bottling food products, according to claim 1, wherein the actuator means (18) of said holding device (2) comprise a cylinder (44) fixed to a support structure (4) and a piston (45) slidingly mobile inside said cylinder (44) and mechanically connected to said arms (15) through motion transmission means; said piston (45) being able to be moved by control means between a first open position with said arms (15) in said closed position, and a second position with said arms (15) in said open position.

9. The machine (1) for treating containers, in particular in a plant for bottling food products, according to claim 8, wherein said control means comprise first pneumatic means to bring said piston (45) into said first position with said arms (15) of said holding device (2) in said closed position.

10. The machine (1) for treating containers, in particular in a plant for bottling food products, according to claim 8, wherein said control means comprise at least one cam mechanism to bring said piston (45) into said second position with said arms (15) of said holding device (2) in said open position.

11. The machine (1) for treating containers, in particular in a plant for bottling food products, according to claim 8, wherein said control means comprise second pneumatic means to bring said piston (45) into said second position with said arms (15) of said holding device (2) in said open position.

12. A machine (1) for treating containers, in particular in a plant for bottling food products, which comprises:

a support frame;

a turntable (70) rotatably mounted on said support frame to rotate around its own vertical shaft (74);

a plurality of holding devices (2) for containers (8) mounted peripherally on said turntable (70) and each comprising:

a support structure (4) mechanically connected to said turntable (70);

at least one pincer equipped with two arms (15) pivoted on said support structure (4) to rotate around its own first rotation axis (Y); each of said arms (15) comprising at least one holding body (20) intended to grasp said container (8);

an actuator (18) mechanically connected to said arms (15) to actuate these to rotate around said first rotation axis (Y) between at least one open position, wherein said holding bodies (20) are separated from one another to receive or release said container (8), and at least one closed position, wherein said holding bodies (20) are close to one another to hold said container (8) between them;

wherein each of said holding bodies (20) of said holding device (2) are connected to a support body (15') of the respective arm (15) through at least one articulation (21) suitable for allowing said holding body (20) to rotate at least around a second rotation axis (Z) lying on a plane ($\pi$) substantially perpendicular to said first rotation axis (Y) of said arms (15) and passing through them, and wherein the articulation (21) of said holding device (2) comprises a pin (28) fixed to said holding body (20), coaxial with respect to said second rotation axis (Z) and intended to be inserted inside a corresponding seat (29) formed on said arm (15) to rotate around said second rotation axis (Z).

13. The machine (1) for treating containers, in particular in a plant for bottling food products, according to claim 12, wherein said holding device (2) comprises restraint means mounted on said arms (15) to prevent the pin (28), of said holding body (20), from axially sliding in said seat (29).

14. The machine (1) for treating containers, in particular in a plant for bottling food products according to claim 13, wherein the restraint means of said holding device (2) comprise at least one ball plunger (30) engaged inside a first hole (31) formed in said arms (15) and in communication with said seat (29); each one of said ball plungers (30) being able to slidingly insert themselves into an annular groove (34) formed on said pin (28).

* * * * *